(12) United States Patent
Wild (10) Patent No.: US 8,198,871 B2
(45) Date of Patent: Jun. 12, 2012

(54) TIME LAG REDUCTION CIRCUIT FOR ALTERNATING CURRENT GENERATOR AND ELECTRIC DRIVE MACHINE USING SAME

(75) Inventor: Arthur Wild, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 266 days.

(21) Appl. No.: 12/319,490

(22) Filed: Jan. 8, 2009

(65) Prior Publication Data

US 2010/0171471 A1    Jul. 8, 2010

(51) Int. Cl.
*H02P 9/00* (2006.01)
*H02P 9/12* (2006.01)

(52) U.S. Cl. .......................................... 322/59; 322/44

(58) Field of Classification Search .................... 322/44, 322/59, 89, 24, 17, 28; 320/124, 140, 155, 320/166
See application file for complete search history.

(56) References Cited

U.S. PATENT DOCUMENTS

| | | |
|---|---|---|
| 2,541,820 A | 2/1951 | Ker |
| 3,289,071 A | 11/1966 | Rosenberry, Jr. |
| 3,982,169 A | 9/1976 | Cummins |
| 4,015,189 A | 3/1977 | Gorden |
| 4,264,856 A | 4/1981 | Frierdich et al. |
| 4,348,620 A * | 9/1982 | Simon ........................... 318/154 |
| 4,426,613 A | 1/1984 | Mizuno et al. |
| 5,243,270 A * | 9/1993 | Mayumi et al. .................. 322/28 |
| 5,510,695 A * | 4/1996 | Tanaka et al. .................... 322/25 |
| 5,973,482 A | 10/1999 | Meinert |
| 6,326,702 B1 | 12/2001 | Yonekura et al. |
| 6,339,316 B1 | 1/2002 | Eguchi et al. |
| 6,522,106 B2 | 2/2003 | Matsumoto et al. |
| 7,106,030 B2 * | 9/2006 | Isurin et al. ..................... 322/59 |
| 7,122,914 B2 | 10/2006 | Caruthers |
| 7,336,059 B2 | 2/2008 | Steigerwald et al. |
| 7,394,229 B2 | 7/2008 | Lim et al. |
| 2004/0257834 A1* | 12/2004 | Kazem ........................... 363/16 |
| 2008/0182466 A1 | 7/2008 | Wegner-Donnelly et al. |

* cited by examiner

Primary Examiner — Julio C. Gonzalez
(74) Attorney, Agent, or Firm — Liell & McNeil (57) ABSTRACT

A field current control circuit for an alternating current generator includes a first voltage source and a time lag reduction circuit, which further includes a generator field that is in selective electrical communication with an energy storage component that is in electrical communication with a time lag reduction voltage source. The time lag reduction circuit may include an electronic controller and be a part of an electric drive machine that receives an operator acceleration command and thereby controls the electrical communication between the energy storage component and the generator field of the time lag reduction circuit. When the energy storage component and generator field are in electrical communication, the current passing through the generator field increases from a starting current to a target current with a reduced time lag compared to predecessor generators.

16 Claims, 4 Drawing Sheets

Figure 4

TIME LAG REDUCTION CIRCUIT FOR ALTERNATING CURRENT GENERATOR AND ELECTRIC DRIVE MACHINE USING SAME

TECHNICAL FIELD

The present disclosure generally relates to an alternating current generator driving a motor of an electric drive machine, and particularly to a time lag reduction strategy for a generator field of the alternating current generator.

BACKGROUND

In many electric drive machines, an alternating current generator is used to provide electrical energy to drive the electric motor of the machine. Typically, the generator supplies a current to the motor, which is operatively coupled to the ground engaging elements of the machine, resulting in the machine moving along the ground.

The voltage and current for the field winding of an alternating current generator are often supplied from a voltage regulator connected to a voltage source. The voltage from the voltage regulator is supplied either directly to the generator's field winding or to the field winding of an exciter. In the latter case the output of the exciter is in turn supplied to the generator's field winding. When a voltage is supplied to a field winding, a current is generated inside the field winding after a small time lag. In most applications, the time lag may be insignificant and therefore, tolerable for the particular application. However, there are some applications where a prolonged time lag may hinder performance.

For instance, an operator wanting to move an electric drive machine up along an incline, needs nearly instant power from the motor to prevent the machine from rolling down the incline. Currently, upon pressing the accelerator of the electric drive machine, the operator either allows the machine to roll down the incline until the motor receives enough current to move the machine up the incline, or the operator engages the brakes of the machine to prevent it from rolling down until the motor receives enough current from the generator to move the machine up. However, engaging the brakes until the motor receives sufficient current may result in an undesirable jerky motion upon release of the brakes. Therefore, the operator must time the release of the brake accordingly to minimize the jerk, or allow the machine to roll down until the motor can move the machine forward.

In typical predecessor machines, the operator communicates an electrical signal to an electronic controller of the machine by pressing the accelerator. Although the electronic controller quickly sends the signal to the generator, the generator does not instantly produce a current in the output winding of the generator, which is in electrical communication with the motor. Rather, there is a response time before which the current begins to flow in the output winding of the generator.

Conventional wisdom in the industry teaches the use of a self-exciting apparatus to control the power output of the generator to the motor. U.S. Pat. No. 4,264,856 teaches the use of a capacitor to maintain a predetermined exciter output current. Furthermore, the capacitor is not electronically connected to an external power voltage source, but rather recharges itself via a feedback capability. This reference recognizes the need for providing a larger output current depending on the demand requirements of the motor but the industry thus far has failed to address the issue of shortening the time lag.

The present disclosure is directed toward at least one of the problems set forth above.

SUMMARY

In one aspect, an electric drive machine includes a frame. Ground engaging elements are connected to the frame and a motor is operatively coupled to the ground engaging elements. A generator including a generator shaft, is in electrical communication with the motor. An engine is operatively coupled to the generator shaft. The generator further includes a generator field and a generator output. A field current control circuit includes a first voltage source that is in electrical communication with a time lag reduction circuit, which includes an energy storage component being in electrical communication with a time lag reduction voltage source. The energy storage component is in selective electrical communication with the generator field.

In another aspect, a method of operating a machine includes operating an engine and rotating a generator shaft that is operatively coupled to the engine. The machine is accelerated by increasing current supply to a motor that is operatively coupled to ground engaging elements of the machine. Accelerating the machine includes increasing field current of a generator in electrical communication with the motor, while the generator is rotating, which includes supplying a first voltage to a generator field and supplying a time lag reduction voltage to the generator field. Supplying a time lag reduction voltage includes establishing an electrical connection between the generator field and an energy storage component, and discharging electrical energy from the energy storage component, which is charged to the time lag reduction voltage.

In yet another aspect, a time lag reduction circuit for a generator includes a generator field and an energy storage component being in selective electrical communication with the generator field via an electrical switch. A time lag reduction voltage source is in electrical communication with the energy storage component. An electronic controller has a time lag reduction algorithm resident on it that receives an operator acceleration command and communicates one of a open switch signal and a close switch signal to the electrical switch. The energy storage component is out of electrical communication with the generator field when the electrical switch receives an open switch signal and the energy storage component is in electrical communication with the generator field when the electrical switch receives a close switch signal.

DETAILED DESCRIPTION

The present disclosure relates to the use of a time lag reduction strategy for reducing the time lag in a generator field of an alternating current generator that drives a motor of an electric drive machine. The time lag in an alternating current generator, in part is caused by the delayed response of the generator field, which may have a relatively high inductance. The present disclosure aims to reduce the finite time taken to allow current passing through the generator field to increase from a starting current to a target current.

Figure 1:
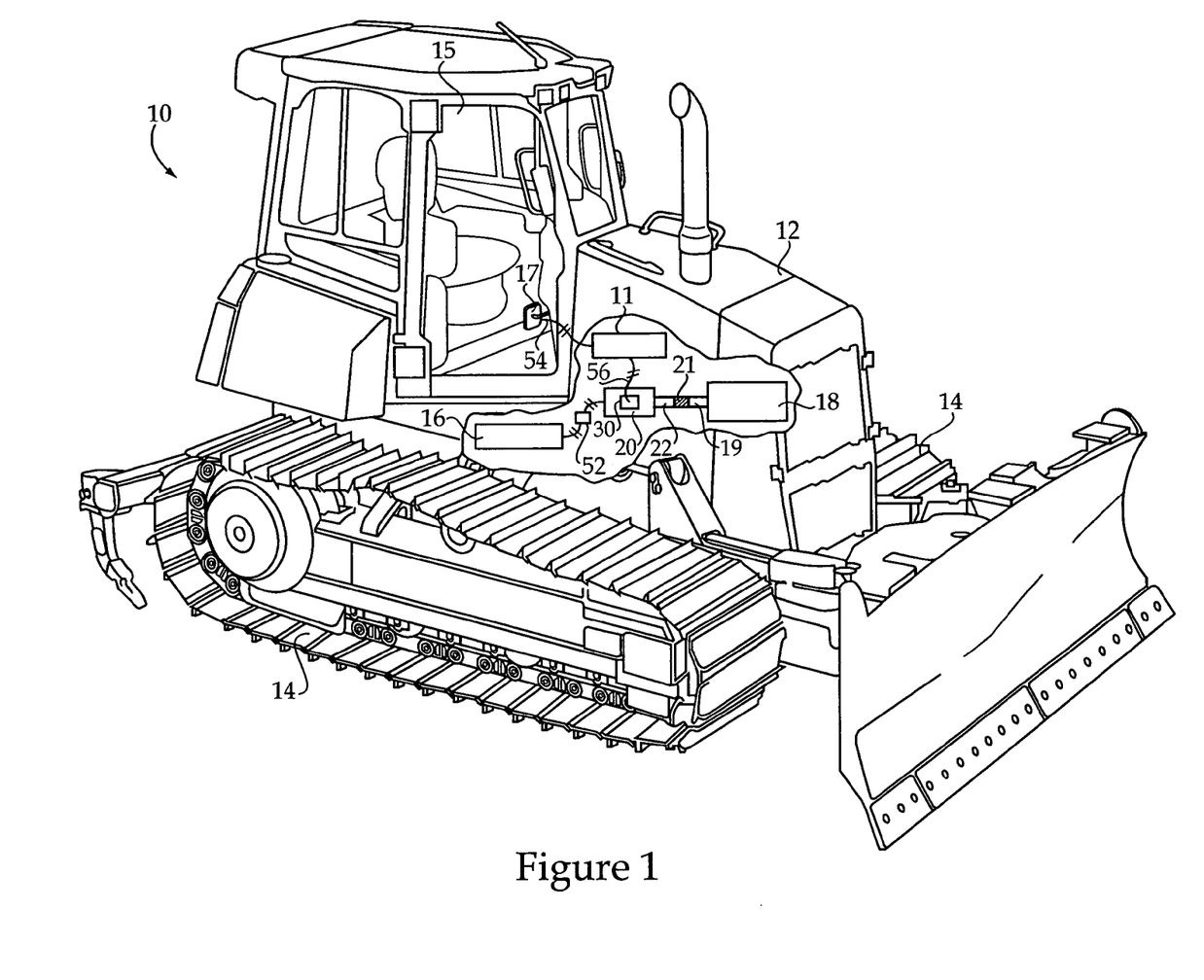
FIG. 1 is a perspective view of an electric drive machine according to the present disclosure.

Referring to FIG. 1, an electric drive machine 10 includes a frame 12, a cab 15 and ground engaging elements 14, such as tracks, connected to the frame 12. The electric drive machine 10 further includes a motor 16 that is operatively coupled to the ground engaging elements 14 allowing the ground engaging elements 14 to rotate when the motor 16 is in operation. A main generator 20 supplies an electrical output, such as a current, to the motor 16 via an electrical invertor 52. The electric drive machine 10 further includes an engine 18 that is operatively coupled to the generator 20. The engine 18 includes an engine shaft 19 and the generator 20 includes a generator shaft 22, which is coupled to the engine shaft 19 via a coupling 21. In one embodiment, the engine shaft 19 and the generator shaft 22 may be a unitary piece. However, to simplify assembly, they are two separate pieces that may be coupled together via the coupling 21.

The present embodiment further includes an exciter 30, which may also be an alternating current generator that produces an electrical output, which is supplied to the main generator 20. In addition, the electric drive machine 10 includes an electronic controller 11, which receives operator acceleration commands from an operator input component 17, such as a foot pedal via an electrical connection 54. The electronic controller 11 communicates signals to the exciter 30 that are responsive to the operator acceleration commands communicated by the operator.

Figure 2:
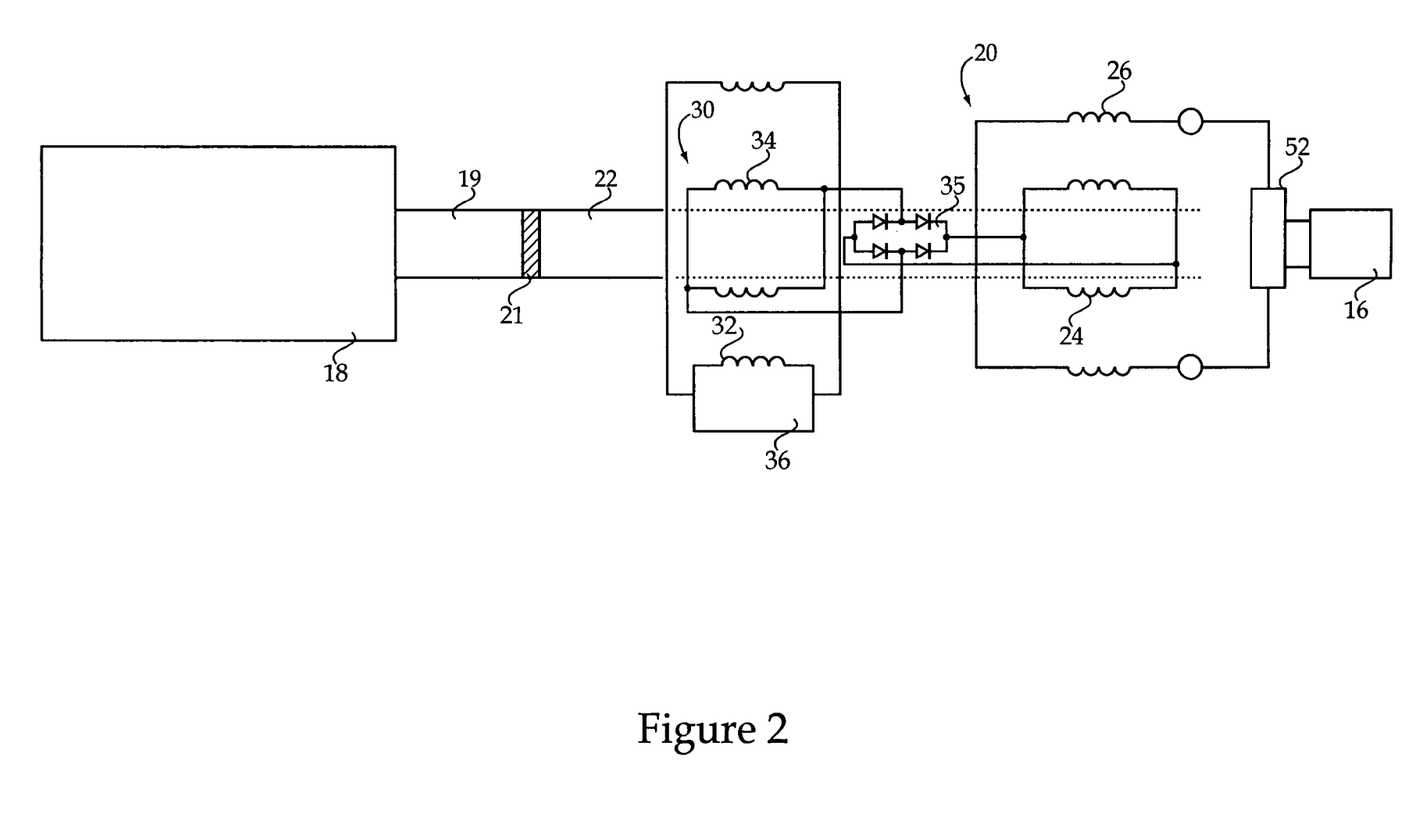
FIG. 2 is a schematic view of some of the internal components and their connections of the electric drive machine shown in FIG. 1.

Referring now to FIG. 2, the engine 18 includes the engine shaft 19, coupled to the generator shaft 22 of the main generator 20 via a coupling 21. The present embodiment shows the exciter 30, which may be an alternating current generator that includes an exciter field 32 and an exciter output winding 34 of the exciter 30. The exciter field 32 is a part of a field current control circuit 36 that is discussed later. The exciter output winding 34 of the exciter 30 is in electrical communication with a main generator field 24 of the main generator 20 via a rectifier 35. The main generator 20 further includes a generator output 26 that remains stationary and may supply a current to the motor 16 via an electrical invertor 52. In one embodiment, the electrical invertor 52 may receive a three phase alternating current from the generator output 26 of the main generator 20. The three phase alternating current from the output 26 is sent to the electrical invertor 52. The electrical invertor changes the three phase alternating current into a high voltage direct current, which is then "chopped" back up to a high voltage three phase alternating current, which is sent to the drive motors. The speed of the electric drive machine is controlled by the electrical invertor 52.

In the present embodiment, the exciter output winding 34, the rectifier 35 and the main generator field 24 are attached to the generator shaft 22 and thereby rotate with the generator shaft 22. The exciter field and the main generator output winding 26 remain stationary.

Those skilled in the art may appreciate that both the exciter generator 30 and the main generator 20 include a generator field 32 and 24 and a generator output winding 34 and 26, and as long as one of the generator field 32 and 24 and the generator output winding 34 and 26 rotates relative to the other of the generator field 32 and 24 and the generator output winding 34 and 26, an output current/voltage is produced. Therefore, in an alternate embodiment of the present disclosure, the exciter field 32 may be coupled to the generator shaft 22 of the main generator 20 while the exciter output winding 34 remains stationary.

Those skilled in the art may appreciate that the exciter generator 30 and the main generator 20 may have different configurations and specifications. In the present embodiment, both the generators are three phase generators, although for the sake of clarity, only two of the three phases are shown in the illustrations. Furthermore, the exciter 30 may operate at lower electrical ratings, including a peak current rating being smaller than the peak current rating on the main generator 20. Although a current may exceed the peak current rating, there is an increased risk of damage to the electrical components by exposing them to current levels greater than the peak rating. By using an exciter, manufacturers may use smaller component parts to provide the electrical power required to operate the motor. For instance, in one embodiment where an exciter is not used, the current supplied to the main generator field may be much higher than what is being supplied to the exciter field, which may not only require the use of a higher voltage battery, but also an alternator large enough to recharge the battery. Further, other considerations such as power losses may be larger when operating at higher currents and voltage. Other considerations for using an exciter may have practical motives, such as using an exciter because gaining access to the generator field may be difficult if the generator is manufactured and packaged by a supplier.

Figure 3:
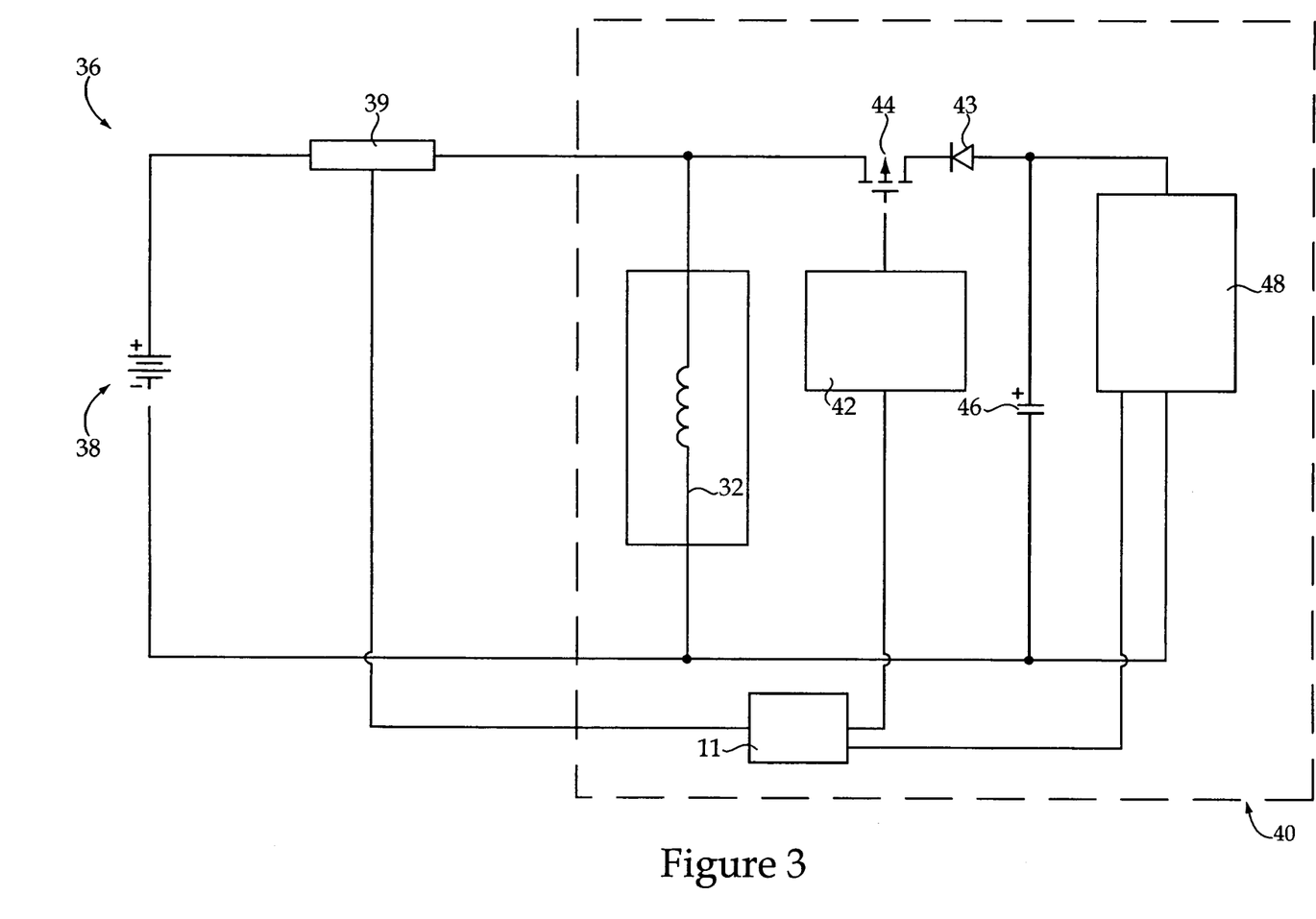
FIG. 3 is a schematic view of a field current control circuit according to the present disclosure.

Referring also to FIG. 3, the field current control circuit 36 is shown. The field current control circuit 36 includes a first voltage source 38 in electrical communication with a time lag reduction circuit 40. In the present embodiment, the first voltage source 38 is connected in series to a voltage regulator 39 to control the current supply to the exciter field 32 from the first voltage source 38. The voltage regulator is in electronic communication with the electronic controller 11, which is a part of the time lag reduction circuit 40. The time lag reduction circuit 40 includes the exciter field 32 and an energy storage component 46 in selective electrical communication with the exciter field 32.

An electrical switch 44 controls the electrical communication between the energy storage component 46 and the exciter field 32. The electrical switch 44 may be in direct electronic communication with an electronic controller 11 or in indirect electronic communication with the electronic controller 11 via a boost controller 42. In one embodiment, the electric switch may be one of a field effect transistor, relay switch, IGBT or the like. The boost controller 42 may be an amplifier that transmits signals to the electric switch 44. When the energy storage component 46 and the exciter field are in electrical communication, the electrical switch 44 is in a first electrical configuration. When the energy storage component 46 is out of electrical communication with the exciter field 32, the switch 44 is in a second electrical configuration.

The energy storage component 46 is also in electrical communication with a time lag reduction voltage source 48, which supplies a time lag reduction voltage to the energy storage component 46. In one embodiment, the time lag reduction voltage is at least an order of magnitude greater than the first voltage supplied by the first voltage source 38. An "order of magnitude greater" means that one is more than ten times greater than the other. 300 is more than ten times greater than 24 but 200 is not more than ten times greater than 24. Therefore, if the time lag reduction voltage is at least an order of magnitude greater than the first voltage, the time lag reduction voltage is at least more than ten times greater than the first voltage.

Still referring to FIG. 3, the electronic controller 11 has a time lag reduction algorithm resident on it, which receives operator acceleration commands from the operator and sends an actuation signal to the electrical switch 44. In the present embodiment, the actuation signal is sent to a boost controller 42, which in turn may send a boosted actuation signal to the electrical switch 44. For the sake of simplicity in the description, actuation signals transmitted from the electronic controller 11 either directly to the electrical switch 44 or indirectly to the electrical switch 44 via the boost controller 42 will be referred to with the same signal names.

A diode 43 allows current to flow from the energy storage component 46 to the exciter field 32 but not vice versa. In the present embodiment, the energy storage component is a capacitor and the time lag reduction voltage source 48 is a low current high voltage fly-back power supply. In one embodiment, the energy storage component is 1 mF and the time lag reduction voltage source 48 is 300V. Furthermore, the time lag reduction voltage source 48 is only capable of a producing a small current, hence it plays a minimal role, if any in the discharging of the energy storage component 46 into the exciter field 32.

Figure 4:
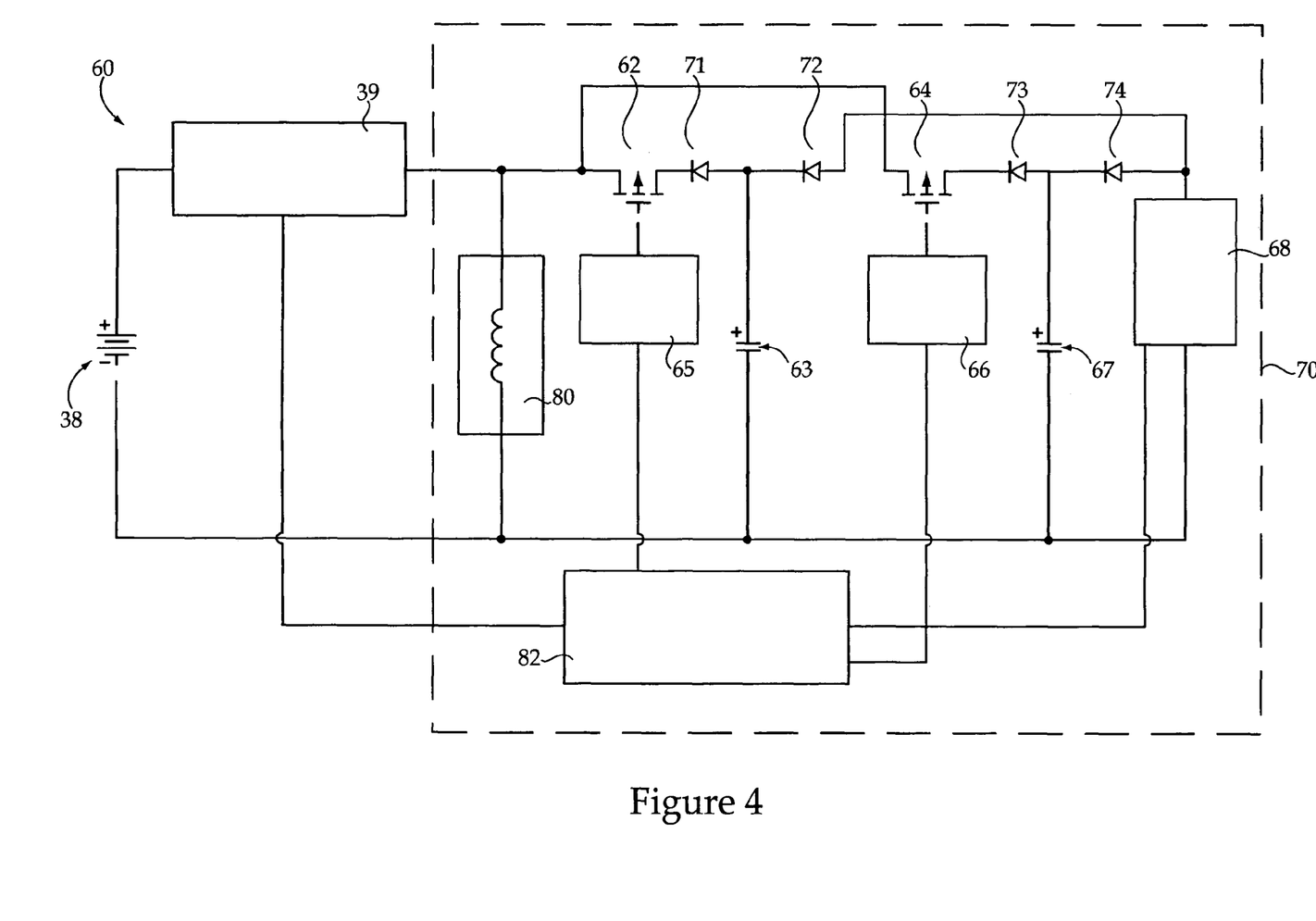
FIG. 4 shows a schematic view of an alternative embodiment of the field current control circuit according to the present disclosure.

Referring to FIG. 4, an alternate embodiment of the present disclosure is shown. Field current control circuit 60 is different from the field current control circuit 36 shown in FIG. 3 only in respect of the time lag reduction circuit. The embodiment shown in FIG. 4 has a time lag reduction circuit 70 that includes a first energy storage component 63 and a second energy storage component 67, a first electrical switch 62 associated with the first energy storage component 63 and a second electrical switch 64 associated with the second energy storage component 67 and a first boost controller 65 and a second boost controller 66. Both the first energy storage component 63 and the second energy storage component 67 are in selective electrical communication with the exciter field 80 and in electrical communication with a time lag reduction voltage source 68 that may be the same as the time lag reduction voltage source 48 (FIG. 3). In the alternate embodiment (FIG. 4) the time lag reduction circuit 70 also includes an exciter field 80 and an electronic controller 82. The electronic controller 82 is in electrical communication with both the first and second electrical switches 62 and 64 via the first and second boost controllers 65 and 66

The scope of the present disclosure is not limited to the embodiments shown or discussed in the present disclosure. For instance, the electrical switch 44 may include a wide variety of switches, such as a field effect transistor, a relay switch or an insulated gate bipolar transistor. Those skilled in the art may appreciate that the components used in these circuits are only used as examples to describe the present disclosure, but are not used to limit the scope of the present disclosure. Furthermore, many of the electrical components shown in FIG. 3 and FIG. 4 may be similar or identical.

INDUSTRIAL APPLICABILITY

The present disclosure finds potential application in electric drive machines having an alternating current generator driving an electric motor. The present disclosure has a general applicability to any application that includes an alternating current generator and is sensitive to a time lag limitation of the generator field.

The present disclosure teaches the use of a time lag reduction strategy for reducing the time lag in a generator field of an alternating current generator that drives a motor of an electric drive machine. In the present embodiment, the electric drive machine 10 includes an alternating current generator 20 that drives a motor 16 via an electrical invertor 52. The engine 18 is operating while the machine 10 is being operated and the electronic controller 11 is executing a time lag reduction algorithm resident thereon. An operator may control various aspects of the electric drive machine 10, such as its movement by using operator input components 17 inside the cab 15. For instance, a foot pedal might be used to increase the speed of the machine 10.

The time lag reduction strategy relates specifically to reducing the time it takes the current passing through the exciter field 32 to increase from a starting current value to a predetermined target current value. In the present embodiment, the operator controls the magnitude of the current passing through the exciter field 32 via the operator input component 17. The operator input component 17 transmits an operator acceleration command to the electronic controller 11 when the operator engages the operator input component 17. In the present embodiment, the operator input component 17 is a foot pedal that may be engaged by the operator pressing the foot pedal.

The time lag reduction circuit is not necessarily need every time the operator wants to accelerate the machine. If, for example, the operator decides to slowly accelerate the machine, then the time lag experienced by the machine may not be a problem and therefore, the time lag reduction circuit may not be needed. However, the time lag reduction circuit is needed under conditions where the machine is idling or running at a relatively slow speed and the operator demands high acceleration within a short period of time.

In order to quickly accelerate the machine 10, the operator may engage the operator input component 17. The speed of the machine 10 is controlled by the electrical invertor 52, which is responsive to the extent of engagement of the operator input component 17, which in one embodiment is the extent of depression of the operator's foot pedal 17. If the engine is idling, then the high voltage direct current is at a minimum. When the operator demands quick acceleration, the time lag reduction circuit is employed such that the electrical invertor increases the frequency and voltage of the alternating current sent to the motor.

The operator input component 17 receives an operator acceleration command from the operator and sends the operator acceleration command to the electronic controller 11. The electronic controller 11 receives the operator acceleration command and communicates a close switch signal to the electrical switch 44, thereby closing the electrical switch 44 and establishing an electrical connection between the exciter field 32 and the electrical storage component 46.

At all times during operation, the first voltage source 38 supplies a current to the exciter field 32. The amount of current supplied depends upon the output demand and is controlled by the voltage regulator 39. In the present embodiment, the first voltage source is a 24 V battery that can supply a current between 1 A and 20 A. When there is no electrical connection between the exciter field 32 and the energy storage component 46, no current flows from the energy storage component 46 to the exciter field 32. Rather, the only current flowing through the exciter field 32 is the current being supplied from the first voltage source 38. During the operation of the machine while the energy storage component 46 is electrically disconnected from the exciter field 32, the engine rotates the generator shaft at the engine operating speed. The current passing through the exciter field 32 may vary depending upon the voltage regulator 39. In one embodiment, the current is the ratio of the first voltage source 38 and the resistance offered by the voltage regulator 59, which may be equal to the target current. The exciter output current is a function of the engine rotation speed and the exciter field current, therefore the current being supplied to the motor is also a function of the engine speed and the exciter field current.

Once the operator engages the operator input component 17, the electrical controller 11 establishes an electrical connection between the exciter field 32 and the energy storage component 46. The energy storage component 46 begins to discharge electrical energy in to the exciter field 32 by supplying a surge of current to the exciter field 32. This surge of current reduces in magnitude as the energy storage component 46 discharges. As the energy storage component 46 begins to discharge, the voltage across the energy storage component 46 begins to drop resulting in a drop in the current being supplied to the exciter field 32.

By supplying a surge of high current to the exciter field 32, the current passing through the exciter field 32 increases from the starting current to its target current quicker than predecessor generators not having a time lag reduction circuit 40. The surge of current continues to increase the current passing through the exciter field 32 until the electrical charge in the energy storage component 46 has either depleted or until the electronic controller 11 transmits the open switch signal to the electrical switch 44, thereby electrically disconnecting the energy storage component 46 and the exciter field 32. An open switch signal may be sent responsive to the operator input component 17 becoming disengaged. Those skilled in the art may design the field current control circuit to open the switch when the current passing through the generator field exceeds a certain predetermined value.

In order to accelerate the machine 10, the motor 16 coupled to the ground engaging elements 14 may need a greater current supply. The current is supplied to the motor 16 from the output winding 26 of the main generator 20. When current is passing through the exciter field 32 and the generator shaft 22 is rotating, current is induced into the exciter output winding 34. The current passes through the rectifier 35, converting the alternating current to a direct current. The direct current from the rectifier 35 passes through the main field of the main generator 20, which is rotating relative to the output winding 26 of the main generator 20 resulting in an induced alternating current flowing through the output winding 26 of the main generator 20. This alternating current is supplied to the motor 16 via electrical invertor 52, which translates the electrical energy to rotational energy in the ground engaging elements 14 of the electric drive machine 10.

In the present embodiment, a boost controller 42 is situated between the electronic controller 11 and the electrical switch 44, such that when the electronic controller 11 sends a close switch signal to the boost controller 42, the boost controller 42 may amplify the close switch signal thereby closing the electrical switch 44.

The electronic controller 11 may communicate a close switch signal or an open switch signal to the electrical switch 44. When the electronic controller 11 receives the operator acceleration command from the operator input component 17, the electronic controller 11 transmits the close switch signal to the electrical switch 44, thereby closing the electrical switch 11 and establishing an electrical connection between the exciter field 32 and the energy storage component 46. However, when the operator does not press the operator input component 17, for instance, when the operator does not want to accelerate the machine, the electronic controller 11 transmits an open switch signal to the electrical switch 44, thereby opening the electrical switch 44 resulting in breaking the electrical connection between the exciter field 32 and the energy storage component 46.

In another embodiment shown in FIG. 4, the electric drive machine includes a similar electric drive machine that is different from the machine shown in FIGS. 1, 2 and 3. The embodiment in FIG. 4 has more than one energy storage component 46 in selective electrical communication with an exciter field 80. An electronic controller 82 may select one of the first energy storage component 63 and the second energy storage component 67 to discharge electrical energy into the exciter field 80. The reason for having two energy storage components 63 and 67 is that if one switch is closed, the first energy storage component will discharge rapidly into the field and boost the field current. It will now take time to recharge the first energy storage component. If a second boost is required immediately after the first energy storage component, the first energy storage component will not be charged and therefore will not be able to supply the boost. By having the second pre-charged energy storage component, the second switch could be switched on to provide the second boost. An alternate strategy may be to close the first switch 62 and leave the second switch 64 open for a period of time until the first energy storage component 63 was supplying a current below a predetermined value, at which point the electronic controller 11 would open the second switch 64 to allow the second energy storage component 67 to supply a current surge to the exciter field 32. In the present embodiment, the electronic controller 11 may select which energy storage component to discharge, based on the demands of the machine. The present disclosure also includes embodiments having more than two energy storage components and embodiments having more than two voltage sources.

Those skilled in the art may appreciate the inherent time lag resulting from the high inductance of the exciter field. The present disclosure may reduce the time it takes for the current passing through the exciter field to increase from the starting current to the target current by supplying a surge of current from an energy storage component. Furthermore, the present disclosure may allow operators to operate their machines with more control and shorter response times. This is beneficial in situations where the machine is on a steep incline and the operator needs to move the machine up the incline without rolling down.

It should be understood that the above description is intended for illustrative purposes only, and is not intended to limit the breadth of the present disclosure in any way. Thus, those skilled in the art will appreciate that various modifications might be made to the presently disclosed embodiments without departing from the full and fair scope of the present disclosure. Other aspects, features and advantages can be obtained from a study of the drawings, and the appended claims.

I claim:

1. An electric drive machine, comprising:
   a frame;
   ground engaging elements connected to the frame;
   a motor operatively coupled to the ground engaging elements;
   a generator including a generator shaft, in electrical communication with the motor;
   an engine, operatively coupled to the generator shaft;
   the generator further including:
   a generator field and a generator output winding;
   a field current control circuit including a first voltage source in electrical communication with a time lag reduction circuit;
   the time lag reduction circuit includes an energy storage component being in electrical communication with a time lag reduction voltage source;

the energy storage component being in selective electrical communication with the generator field via an electrical switch;

an electronic controller having a time lag reduction algorithm resident thereon that receives an operator acceleration command and communicates one of an open switch signal and a close switch signal to the electrical switch;

the energy storage component being out of electrical communication with the generator field when the electrical switch receives the open switch signal;

the energy storage component being in electrical communication with the generator field when the electrical switch receives the close switch signal; and wherein closure of the electrical switch surges current to the generator field toward a target current responsive to discharge of electrical energy from the electrical storage component wherein the time lag reduction voltage source is a source for charging the electrical storage component with electrical energy prior to a subsequent closure of the electrical switch.

2. The electric drive machine of claim 1, wherein:
the generator being an exciter generator;
the generator output winding of the exciter generator in electrical communication with a main generator field of a main generator;
the main generator field of the main generator and the generator output winding of the exciter generator rotatable with the generator shaft.

3. The electric drive machine of claim 1 wherein the energy storage component of the time lag reduction circuit is a capacitor.

4. The electric drive machine of claim 1 wherein the time lag reduction voltage source is a low current voltage source; and
the time lag reduction voltage source supplying a time lag reduction voltage being at least an order of magnitude greater than a first voltage supplied by the first voltage source.

5. The electric drive machine of claim 1, wherein:
the electrical switch is a field effect transistor; and
the field effect transistor being in electrical communication with the electronic controller.

6. The electric drive machine of claim 1, wherein the time lag reduction circuit further includes a second energy storage component being in selective electrical communication with the generator field.

7. The electric drive machine of claim 1 further includes at least two energy storage components being in selective electrical communication with the generator field and the time lag reduction voltage source.

8. A method of operating a machine comprising the steps of:
operating an engine;
rotating a generator shaft, operatively coupled to the engine;
accelerating the machine by increasing current supply to a motor operatively coupled to ground engaging elements of the machine, the step of accelerating the machine includes a step of:
increasing field current of a generator in electrical communication with the motor, while the generator is rotating, including the steps of:
supplying a first voltage to a generator field;
supplying a time lag reduction voltage to the generator field, the step of supplying a time lag reduction voltage includes the steps of:
establishing an electrical connection between the generator field and an energy storage component;
discharging electrical energy from the energy storage component to surge current to the generator field toward a target current, charged to the time lag reduction voltage;
wherein the step of establishing an electrical connection includes a step of executing a time lag reduction algorithm resident on an electronic controller;
wherein the step of executing a time lag reduction algorithm further includes the steps of:
receiving an operator acceleration command from an operator via an operator input component;
transmitting the operator acceleration command to an electronic controller of the time lag reduction circuit;
selectin one of at least one energy storage component to establish an electrical connection with the generator field;
communicating a close switch signal to an electrical switch associated with the one of at least one energy storage component; and
closing the electrical switch.

9. The method of operating a machine of claim 8 wherein the step of supplying a time lag reduction voltage includes the steps of:
reducing the time lag reduction voltage supplied by the energy storage component; and
increasing the current of the generator field.

10. The method of operating a machine of claim 8, wherein the step of increasing field current of a generator further includes the steps of:
determining field current in the generator field; and
opening a switch when the field current has reached a predetermined value.

11. A time lag reduction circuit for a generator, comprising:
a generator field;
an energy storage component being in selective electrical communication with the generator field via an electrical switch;
a time lag reduction voltage source being in electrical communication with the energy storage component;
an electronic controller having a time lag reduction algorithm resident thereon that receives an operator acceleration command and communicates one of an open switch signal and a close switch signal to the electrical switch;
the energy storage component being out of electrical communication with the generator field when the electrical switch receives the open switch signal; and
the energy storage component being in electrical communication with the generator field when the electrical switch receives the close switch signal; and
wherein closure of the electrical switch surges current to the generator field toward a target current responsive to discharge of electrical energy from the electrical storage component wherein the time lag reduction voltage source is a source for charging the electrical storage component with electrical energy prior to a subsequent closure of the electrical switch.

12. The time lag reduction circuit of claim 11, wherein the time lag reduction voltage source has a low supply current.

13. The time lag reduction circuit of claim 11, wherein:
the electrical switch is a field effect transistor; and
the field effect transistor being in electrical communication with the electronic controller.

14. The time lag reduction circuit of claim 11 further includes:

a second energy storage component being in electrical communication with the time lag reduction voltage source; and the second energy storage component being in selective electrical communication with the generator field.

15. The time lag reduction circuit of claim 11 further includes at least two energy storage components being in selective electrical communication with the generator field and the time lag reduction voltage source.

16. The time lag reduction circuit of claim 11 wherein the energy storage component of the time lag reduction circuit is a capacitor.

* * * * *